(12) United States Patent
Sakai (10) Patent No.: US 9,995,926 B1
(45) Date of Patent: Jun. 12, 2018

(54) ELECTROWETTING DISPLAY DEVICE INCLUDING AN INTERNAL REFRACTIVE DIFFUSER

(71) Applicant: Amazon Technologies, Inc., Seattle, WA (US)

(72) Inventor: Toru Sakai, Waalre (NL)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days. days.

(21) Appl. No.: 14/968,656

(22) Filed: Dec. 14, 2015

(51) Int. Cl.
| | |
|---|---|
| *G02B 26/00* | (2006.01) |
| *G02B 26/08* | (2006.01) |
| *G02F 1/29* | (2006.01) |
| *G02B 5/02* | (2006.01) |

(52) U.S. Cl.
CPC ......... *G02B 26/005* (2013.01); *G02B 5/0215* (2013.01)

(58) Field of Classification Search
USPC ............... 359/237, 242, 265–267, 270–273, 359/290–292, 295, 298, 315, 321, 322
See application file for complete search history.

(56) References Cited

U.S. PATENT DOCUMENTS 9,678,330 B1* 6/2017 Sakai .................. G02B 26/005

* cited by examiner

*Primary Examiner* — Brandi Thomas
(74) *Attorney, Agent, or Firm* — Brinks Gilson & Lione (57) ABSTRACT

A display device includes a first support plate. A pixel region is positioned over the first support plate. The pixel region includes a pixel and an electrode layer disposed between the first support plate and the pixel region. A specular reflective layer is disposed on the electrode layer. The specular reflective layer has a first refractive index. A diffusion layer is disposed on the specular reflective layer. The diffusion layer includes a plurality of islands. Each island of the plurality of islands is separated by a distance from an adjacent island of the plurality of islands, wherein a portion of the specular reflective layer is exposed between two adjacent islands of the plurality of islands. Each island has a second refractive index greater than the first refractive index.

16 Claims, 5 Drawing Sheets

ELECTROWETTING DISPLAY DEVICE INCLUDING AN INTERNAL REFRACTIVE DIFFUSER

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the type and the purpose of the associated electronic device. The appearance and the quality of a display may affect a user's experience with the electronic device and the content presented thereon. Accordingly, enhancing user experience and satisfaction continues to be a priority.

At least some conventional electronic displays include a metal reflector on a bottom plate of the display and, for example, a polymer-based diffuser layer laminated over or coated on an opposite top plate of the display as a film material. In some instances, the film material adds to an overall thickness of the top plate and may negatively affect the quality of the display image.

BRIEF DESCRIPTION OF THE DRAWINGS

The detailed description is set forth with reference to the accompanying figures. The use of the same reference numbers in different figures indicates similar or identical items or features.

DETAILED DESCRIPTION

In embodiments described herein, an electrowetting pixel region includes an electrowetting pixel region electrode having a specular reflector layer and a diffusion layer over, e.g., deposited on, the specular reflector layer. The diffusion layer includes a plurality of islands, either randomly positioned or patterned on the specular reflector layer. An organic planarization layer is deposited on the diffusion layer. Each island has a refractive index greater than a refractive index of the organic planarization layer and a refractive index of the specular reflective layer to provide a diffusing effect on light entering the associated electrowetting pixel region. In certain embodiments, the diffusion layer is made of silicon nitride that is patterned to form a plurality of silicon nitride islands separated by voids. Light that impinges on the silicon nitride islands is reflected as diffuse light or refracted, while light passing through the voids impinges on the specular reflector layer and is reflected by the specular reflector layer to provide specular reflection. The combination of the specular reflective layer with the diffusion layer provides for a desired combination of specular reflection and diffuse reflection of light within the electrowetting pixel region, to provide a display having an improved paper-like appearance while maintaining a desired brightness level.

In certain embodiments, a pixel region may include a pixel or a pixel having two or more sub-pixels of a display device. Such pixels or sub-pixels may be the smallest light transmissive, reflective or transflective unit of a display that is individually operable to directly control an amount of light transmission through or reflection from the pixel region. For example, in some embodiments, a pixel may include a red sub-pixel, a green sub-pixel, a blue sub-pixel, and a white sub-pixel for RGBW displays. In other embodiments, a pixel may be a smallest component, e.g., the pixel does not include any sub-pixels.

In embodiments described herein, an electrowetting display device includes an electrode layer having a specular reflective layer positioned under a pixel grid having a plurality of electrowetting pixels. Each electrowetting pixel is formed by one or more respective pixel walls to define a display surface area of the electrowetting pixel. The electrowetting pixels may have one or more specific and/or additional structural features. In the example embodiment, the specular reflective layer is positioned within each electrowetting pixel and a diffusion layer is positioned on the specular reflective layer within each electrowetting pixel. In alternative embodiments, the specular reflective layer is positioned under each electrowetting pixel with the diffusion layer positioned on the specular layer within or under each electrowetting pixel. In certain embodiments, the specular reflective layer includes an aluminum material, or another suitable material including, without limitation, a metal, an alloy, a doped metal, or a dielectric reflector material and the diffusion layer includes a suitable diffuse reflective material, such as silicon nitride ($SiN_x$), for example.

During operation of the electrowetting display device, light enters the electrowetting display device through a top support plate as a voltage source applies a voltage over the electrode layers, i.e., a first or pixel region electrode and a second or top electrode to cause displacement of a fluid, such as a first fluid, contained within one or more electrowetting pixels. The light travels through each electrowetting pixel and impinges on an island in the diffusion layer or passes through a void in the diffusion layer to impinge on the specular reflective layer of the electrode. When light impinges on a surface of an island in the diffusion layer, the light may be reflected as diffuse reflected light or refracted as the light propagates into the island due to a difference in refractive indices between the organic planarization layer and the diffusion layer. If light travels through a void in the diffusion layer, the light impinges on a surface of the specular reflective layer and is reflected as specular reflected light which then travels through the island and/or the organic planarization layer and out of the electrowetting display device through the top support plate. As described in greater detail below, a position, a configuration, e.g., a slope of a side wall or surface, and/or one or more dimensions of each island formed in the diffusion layer may be selected to optimize an optical performance of the electrowetting display device by adjusting the diffuse reflectance and/or the specular reflectance to provide a more paper-like appearance while maintaining a desired brightness level provided by the specular reflectance.

In general, the term "specular reflection" or "specular reflectance" refers to a mirror-like reflection of light from a surface in which light from a single incoming angle or direction (an incident ray) is reflected in a single outgoing angle or direction. In general, the term "diffuse reflection" or "diffuse reflectance" refers to the reflection of light from a surface in which an incident ray is reflected at more than one angle or direction, e.g., many angles or directions, rather than at only one angle or direction as in the case of specular reflection. In general, the term "refraction" refers to a change in direction of propagation of a light ray due to a change in its transmission medium. Due to change of medium, the phase velocity of the light ray is changed but its frequency remains constant. This is most commonly observed when a light ray passes from one medium to another medium at any angle other than 0° from the normal. For example, refraction of light occurs at the interface between the two media of different refractive indices, with $n_2 > n_1$. Because the phase velocity is lower in the second medium ($v_2 < v_1$), the angle of refraction $\theta_2$ is less than the angle of incidence $\theta_1$; that is, the ray in the higher-index medium is closer to the normal. In optics, refraction is a phenomenon that often occurs when light rays travel at an oblique angle from a medium with a first refractive index to a medium with a second refractive index different from the first refractive index, e.g., greater than the first refractive index. At the boundary between the media, the phase velocity of the light ray is altered, usually causing a change in direction.

To optimize the display performance, therefore, as disclosed in certain embodiments herein, the electrowetting display device includes both a specular reflective layer on the electrode layer and a diffusion layer over the specular reflective layer including a plurality of islands positioned with respect to each electrowetting pixel to optimize the specular reflectance and/or the diffuse reflectance within the electrowetting pixel and provide a more paper-like appearance while maintaining a desired brightness level.

In various embodiments described herein, electronic devices include electrowetting displays for presenting content. In some examples, the electronic devices may include one or more components associated with the electrowetting display, such as a touch sensor component layered atop the electrowetting display for detecting touch inputs, a front light and/or a back light component for lighting the electrowetting display, and/or a cover layer component, which may include anti-glare properties, anti-reflective properties, anti-fingerprint properties, and/or anti-cracking properties, for example.

In certain embodiments, the electrowetting pixel region includes an electrowetting pixel defined by one or more pixel walls that surround or are otherwise associated with at least a portion of the electrowetting pixel. The pixel walls form a structure that is configured to contain at least a portion of a first fluid, such as an opaque oil. Light transmission through the electrowetting pixel is controlled by the application of an electric potential to the electrowetting pixel, which results in a movement of a second fluid, such as an electrolyte solution, into the electrowetting pixel, thereby displacing the first fluid.

When the electrowetting pixel is in an off state (i.e., with no electric potential applied), the first fluid, e.g., the opaque oil, is distributed throughout the electrowetting pixel to substantially cover the display surface area of the electrowetting pixel. The first fluid absorbs light and the electrowetting pixel in this condition appears black in one embodiment. But when the electric potential is applied, the electrowetting pixel is in an on state and the first fluid is displaced to one or more sides of the electrowetting pixel, for example. Light can then enter the electrowetting pixel and impinge upon a surface of an island formed in the diffusion layer and/or a surface of the specular reflector layer of the electrode layer, positioned at or near a bottom surface of the electrowetting pixel. For example, light that impinges on the island in the diffusion layer may propagate through the island and impinge on the surface of the specular reflective layer at a different incident angle. The light is then reflected by the specular reflective layer and may propagate through the island to reflect out of the electrowetting pixel as diffuse reflectance, causing the electrowetting pixel to appear bright, e.g., white, to an observer. Alternatively, the light that impinges on the specular reflective layer of the electrode layer is reflected by the surface of the specular reflective layer as specular reflectance. If the one or more reflective surfaces reflect only a portion of the light spectrum or if color filters are incorporated into the electrowetting pixel structure, e.g., within the organic planarization layer, the electrowetting pixel may appear to have color.

A display device, such as an electrowetting display device, may include a transmissive, reflective or transflective display that generally includes an array of pixels (e.g., which may comprise sub-pixels) configured to be operated by an active matrix addressing scheme. For example, rows and columns of electrowetting pixels are operated by controlling voltage levels on a plurality of source lines and gate lines. In this fashion, the display device may produce an image by selecting particular pixels to transmit, reflect or block light. Pixels are addressed (e.g., selected) via rows and columns of the source lines and the gate lines that are electrically connected to transistors (e.g., used as switches) included in each pixel. Transistors occupy a relatively small fraction of the area of each pixel to allow light to efficiently pass through (or reflect from) the pixel.

The array of pixels is sandwiched between two support plates, such as a bottom support plate and an opposing top support plate. For example, a bottom support plate in cooperation with a top support plate may contain pixels that include electrowetting oil, electrolyte solution and pixel walls between the support plates. The support plates may be made of any suitable material including, without limitation, plastic, glass, quartz, and semiconducting materials, and may be made of a rigid material or a flexible material, for example. Pixel regions, e.g., pixels, include various layers of materials built upon the bottom support plate. One example layer is an amorphous fluoropolymer (AF1600®) with hydrophobic behavior. The pixel walls may be formed on a top surface of the hydrophobic layer, or, alternatively, may be formed before the hydrophobic layer is deposited, for example. The bottom support plate may be opaque while the top support plate is transparent. Describing a pixel or material as being "transparent" generally means that the pixel or the material may transmit a relatively large fraction of the light incident upon it. For example, a transparent material or layer might transmit more than 70% or 80% of the light impinging on its surface, although in other examples a transparent material or structure might transmit a different percentage of incident light. In general, transparent materials or structures need not be perfectly transparent.

Hereinafter, example embodiments include, but are not limited to, reflective electrowetting displays having a clear or transparent top support plate and a bottom support plate, which need not be transparent. In general, "top" and "bottom" may be used to identify opposing support plates of an electrowetting display and do not necessarily refer to a direction referenced to gravity or to a viewing side of the electrowetting display device. In example embodiments, the top support plate is the surface through which pixels of a (reflective) electrowetting display are viewed.

As described above, individual reflective electrowetting pixels may include an electrode layer containing the drive electronics like TFTs, source lines, and gate lines on the bottom support plate, a reflective layer adjacent to or on the electrode layer, a pixel electrode adjacent to the reflective layer, a barrier layer on the reflective layer, and a hydrophobic layer on the barrier layer. In certain embodiments, the reflective layer itself can act as the pixel electrode. The pixel electrode in principle is close to the fluids in the pixel to minimize power consumption. In one alternative embodiment, a patterned layer of indium tin oxide (ITO) is deposited as the pixel electrode over the reflective layer. In another alternative embodiment, the pixel electrode is under the reflective layer. The electrode layer as shown in FIGS. 1, 2, 4, and 5 can be an electrode layer containing at least part of the drive electronics if the reflective layer is used as the electrode or the electrode layer can contain the pixel electrodes in contact with the reflective layer. Pixel walls of each pixel, the hydrophobic layer, and the transparent top support plate at least partially enclose a fluid region within the cavity that contains the first fluid which is electrically non-conductive, e.g., an opaque oil retained in the individual electrowetting pixels by pixel walls, and the second fluid, e.g., an electrolyte solution, that is electrically conductive or polar and may be a water or a salt solution, such as a solution of potassium chloride in water. The second fluid may be transparent, but may be colored, or light-absorbing. The second fluid is immiscible with the first fluid. In general, substances are "immiscible" with one another if the substances do not substantially form a solution, although in a particular embodiment the second fluid might not be perfectly immiscible with the first fluid. In general, an "opaque" fluid is a fluid that appears black to an observer. For example, an opaque fluid strongly absorbs a broad spectrum of wavelengths (e.g., including those of red, green and blue light) in the visible region of electromagnetic radiation appearing black. However, in certain embodiments an opaque fluid may absorb a relatively narrower spectrum of wavelengths in the visible region of electromagnetic radiation and may not appear perfectly black. In example embodiments, each of the first fluid and the second fluid is a liquid.

In some embodiments, the opaque fluid is a nonpolar electrowetting oil. In certain embodiments, the first fluid may absorb at least a portion of the visible light spectrum. The first fluid may be transmissive for a portion of the visible light spectrum, forming a color filter. For this purpose, the first fluid may be colored by addition of pigment particles or a dye. Alternatively, the first fluid may be black, for example by absorbing substantially all portions of the visible light spectrum, or reflecting. A reflective first fluid may reflect the entire visible light spectrum, making the layer appear white, or a portion of the entire visible light spectrum, making the layer have a color. In example embodiments, the first fluid is black and, therefore, absorbs substantially all portions of an optical light spectrum.

Spacers and edge seals mechanically connect the first support plate with the overlying, opposing second support plate, or form a separation between the first support plate and the second support plate, to contribute to the mechanical integrity of the electrowetting display device. Edge seals, for example, disposed along a periphery of an array of electrowetting pixels, may contribute to retaining fluids (e.g., the first fluid and the second fluid) between the first support plate and the overlying second support plate.

In some embodiments, the electrowetting display device as described herein may be incorporated into a system that includes one or more processors and one or more computer memories, which may reside on a control board, for example. Display software may be stored on the one or more memories and may be operable with the one or more processors to modulate light that is received from an outside source (e.g., ambient room light) or out-coupled from a lightguide of the electrowetting display device. For example, display software may include code executable by a processor to modulate optical properties of individual pixels of the electrowetting display device based at least in part on electronic signals representative of static image and/or video data. The code may cause the processor to modulate the optical properties of pixels by controlling electrical signals (e.g., voltages, currents, and fields) on, over, and/or in layers of the electrowetting display device.

Figure 1:
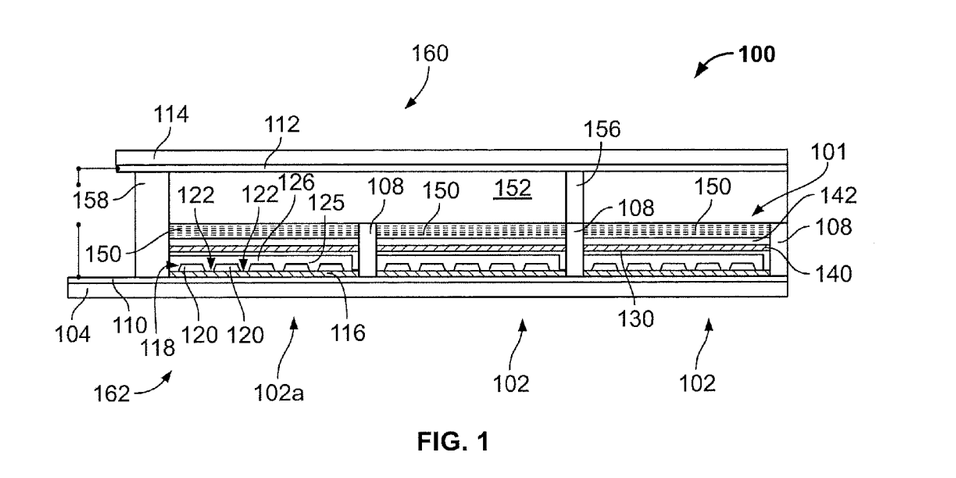
FIG. 1 is a cross-sectional view of the example electrowetting display device of FIG. 3 along sectional line 1-1, according to one embodiment.
Figure 2:
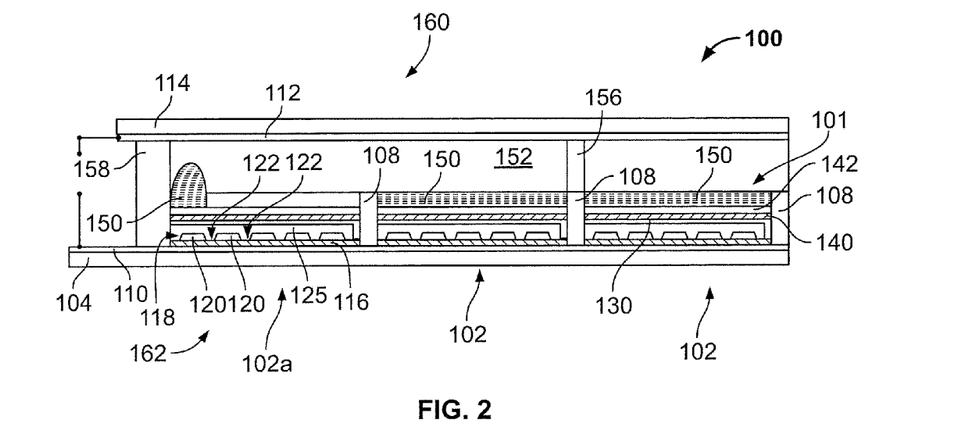
FIG. 2 is a cross-sectional view of the electrowetting display device of FIG. 3 along sectional line 1-1 with a first pixel activated to expose at least a portion of a reflective layer.
Figure 3:
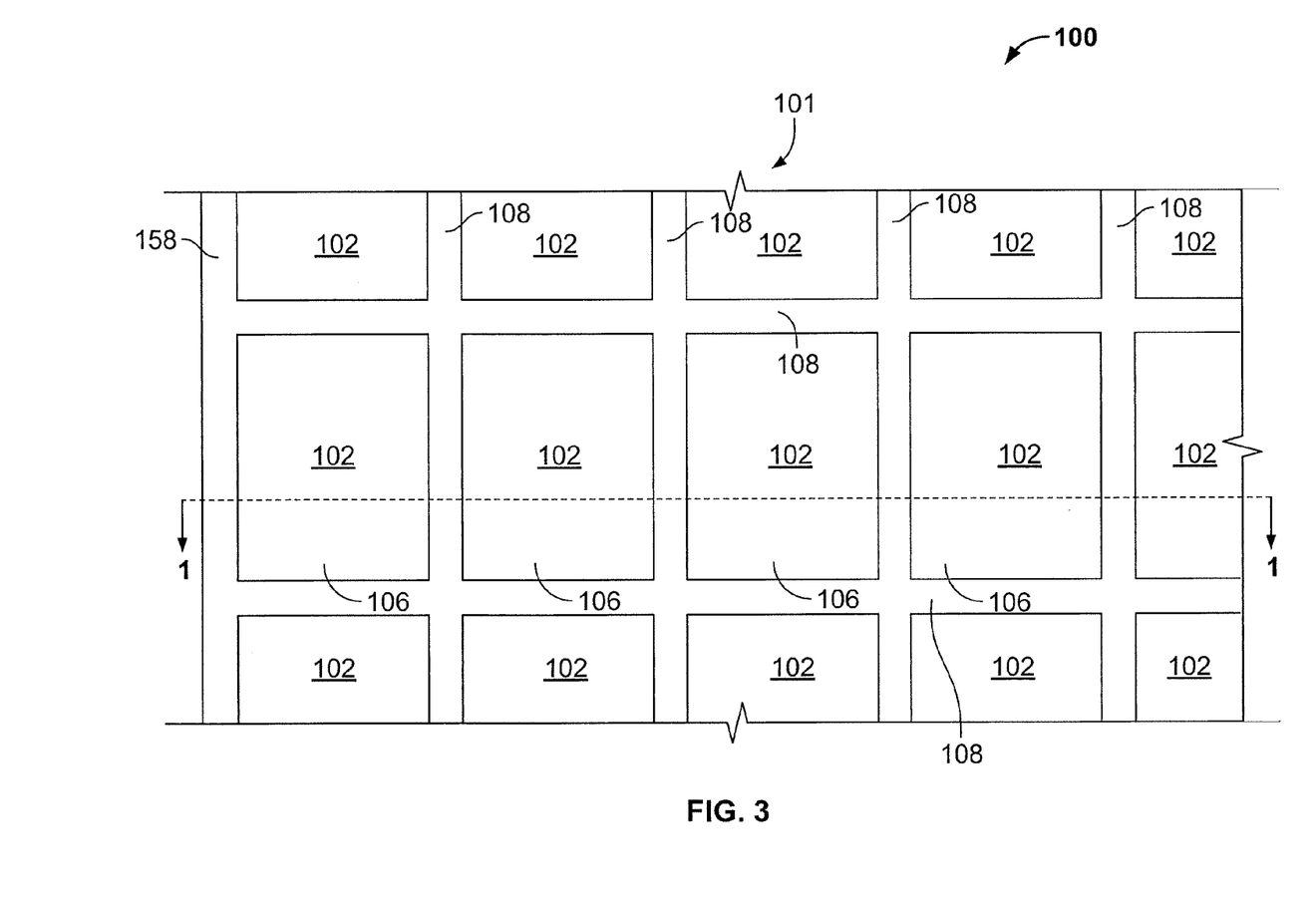
FIG. 3 is a top view of a plurality of electrowetting pixels of an example electrowetting display device.

Referring now to the figures, FIG. 1 is a cross-sectional view of a portion of an example reflective electrowetting display device 100 including a pixel region having a pixel grid 101 with several electrowetting pixels 102 taken along a sectional line 1-1 of FIG. 3. FIG. 2 shows the same cross-sectional view as FIG. 1 in which an electric potential has been applied to one electrowetting pixel 102a causing displacement of a first fluid disposed therein, as described below. Four complete electrowetting pixels 102 (including 102a) are shown in cross-section in FIGS. 1 and 2. FIG. 3 is a top view of example reflective electrowetting display device 100 including pixel grid 101 having a plurality of electrowetting pixels 102 formed over a first or bottom support plate 104 (shown in FIGS. 1 and 2). As shown in FIGS. 1 and 3, each electrowetting pixel 102 defines a display surface area 106. More specifically, in this embodiment display surface area 106 is defined by pixel walls 108, as described below, having a first dimension, such as a width, between opposing lateral pixel walls 108, and a second dimension, such as a length, between the remaining opposing pixel walls 108. Electrowetting display device 100 may include any number (usually a very large number, such as thousands or millions) of electrowetting pixels 102.

Referring further to FIGS. 1 and 2, an electrode layer 110 having a plurality of pixel electrodes is positioned over, e.g., formed on, bottom support plate 104 and between electrowetting pixels 102 and bottom support plate 104. Electrode layer 110 and/or the one or more pixel electrodes are operatively coupled to a second electrode 112 positioned adjacent, e.g., under, a second or top support plate 114 for creating, in conjunction with common electrode 112, a voltage differential between electrode layer 110 and common electrode 112 to cause relative displacement of a first fluid, e.g., an oil, and a second fluid, e.g., an electrolyte fluid, within the electrowetting pixel region. Alternatively, second electrode 112 may be along a side of the display in contact with the second fluid. These example embodiments are not limiting with respect to the location of the first and second electrode, and claimed subject matter is not limited in this respect. In particular embodiments, one or more additional layers may be positioned between electrode layer 110 and bottom support plate 104, in which TFTs, gates, and/or source lines are located, for example. In these embodiments, electrode layer 110 may not be formed directly on bottom support plate 104. In various embodiments, electrode layer 110 may be connected to any number of transistors, such as suitable thin film transistors (TFTs) (not shown), that are switched to either select or deselect corresponding electrowetting pixels 102 using active matrix addressing, for example. A TFT is a particular type of field-effect transistor that includes thin films of an active semiconductor layer as well as a dielectric layer and metallic contacts over a supporting (but non-conducting) substrate, which may be glass or any suitable transparent or non-transparent material, for example.

A specular reflective layer 116 is positioned adjacent, e.g., on electrode layer 110, as shown in FIGS. 1 and 2, for example. In particular embodiments, one or more additional layers may be positioned between specular reflective layer 116 and electrode layer 110. In these embodiments, specular reflective layer 116 may not be formed directly on electrode layer 110. In an alternative embodiment, specular reflective layer 116 is positioned under a transparent electrode layer. In this alternative embodiment, specular reflective layer 116 is positioned between the transparent electrode layer and bottom support plate 104. Specular reflective layer 116 may reflect light within the entire visible spectrum, making the layer appear white, or reflect a portion of light within the visible spectrum, making the layer have a color. In this embodiment, specular reflective layer 116 is positioned within the pixel region, e.g., within each electrowetting pixel 102. As shown in FIGS. 1 and 2, specular reflective layer 116 is positioned on electrode layer 110 with respect to, e.g., within or under, display surface area 106 of electrowetting pixel 102.

In certain embodiments, specular reflective layer 116 is formed or made of any suitable materials including, for example, a metal (90%, 95% or greater than 95% metal), an alloy, a doped metal, or a dielectric reflector material or any combination thereof. Suitable metal materials for specular reflective layer 116 include, without limitation, aluminum, silver, gold, copper, nickel, platinum, rhodium, lanthanum, and/or silicon nickel. Suitable alloy materials for specular reflective layer 116 include, without limitation, aluminum with copper or aluminum with nickel. In alternative embodiments, specular reflective layer 116 is made of any suitable material providing a desired specular reflectance. In certain embodiments, specular reflective layer 116 has a first refractive index not greater than 2.0. Moreover, in certain embodiments, specular reflective layer 116 has a reflectance, R, greater than 0.2500, and, more particularly, a reflectance of 0.4000 to 0.9600. Various optical properties for suitable materials for specular reflective layer 116 are shown in Table 1 below. The optical property values are for light having a wavelength of 589.29 nanometers.

TABLE 1

| Material | Refractive Index n | Extinction Coefficient k | Absorption Coefficient (1/cm) Alpha | Reflectance R |
| --- | --- | --- | --- | --- |
| Ag | 0.1504 | 3.4853 | 8.3399E+05 | 0.95534 |
| Al | 1.1032 | 6.8121 | 1.4526E+06 | 0.91318 |
| Au | 0.2657 | 2.7979 | 5.9665E+05 | 0.88730 |
| Cu | 0.4528 | 2.9903 | 6.3768E+05 | 0.83614 |
| Cr | 3.0617 | 4.2522 | 9.0676E+05 | 0.64583 |
| Ni | 1.9118 | 3.4739 | 7.4080E+05 | 0.62782 |
| Ti | 2.6146 | 3.6092 | 7.6964E+05 | 0.59916 |
| W | 3.5805 | 2.7868 | 5.9427E+05 | 0.50179 |
| Mo | 3.7362 | 3.5912 | 6.7659E+05 | 0.57698 |
| Ta | 1.4478 | 2.3306 | 4.3909E+05 | 0.49304 |

Figure 4:
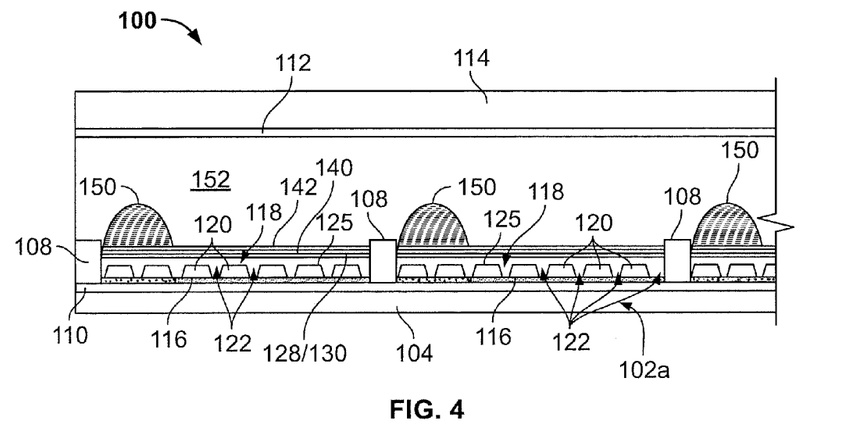
FIG. 4 is a cross-sectional view of a portion of the example electrowetting display device of FIG. 3 with pixels activated to expose at least a portion of a reflective layer within each pixel, according to one embodiment.
Figure 5:
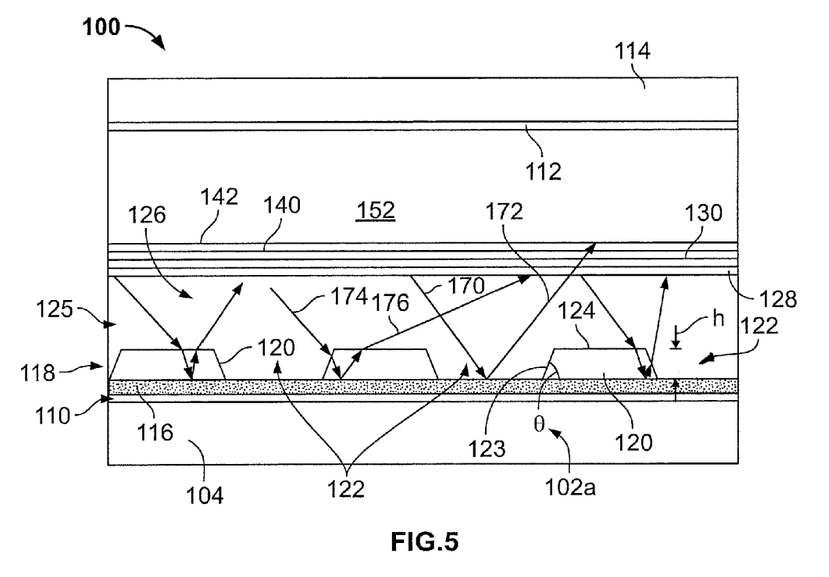
FIG. 5 is a cross-sectional view of a portion of the activated first pixel shown in FIG. 4.

In the example embodiment, a diffusion layer 118 is applied over specular reflective layer 116, e.g., on specular reflective layer 116. Referring further to FIGS. 2, 4 and 5, diffusion layer 118 is patterned using a suitable technique, such as described herein, to form a plurality of islands 120 separated by a distance between the plurality of islands 120 defining one or more voids 122 through diffusion layer 116 through which specular reflective layer 114 is exposed. Islands 120 may be either randomly positioned or patterned on specular reflector layer 116. In the example embodiment, diffusion layer 118 is made of a suitable diffuse reflective material deposited on or over specular reflective layer 116. In this embodiment, diffusion layer 118, e.g., each island 120, has a second refractive index greater than the first refractive index of specular reflective layer 116. For example, in certain embodiments, diffusion layer 118 has a second refractive index equal to or greater than 1.5, and, in particular embodiments, diffusion layer 118 has a second refractive index of 1.5 to 2.5. Although diffusion layer 118 may include any suitable diffuse reflective material providing a desired diffuse reflectance, in the example embodiment, the diffuse reflective material of diffusion layer 118 is silicon nitride ($SiN_x$). In this embodiment, each island 120 comprises silicon nitride having a second refractive index of 2.0167. Further, in certain embodiments, each island 120 has a suitable height, h (shown in FIG. 5), of 0.1 micrometers to 2 micrometers corresponding to a thickness of diffusion layer 118, and, in particular embodiments, each island 120 has a height of 550 nanometers (nm). Further, each island 120 includes a side wall 123 having a suitable angle of slope, θ, with respect to a surface of specular reflective layer 116. In the example embodiment, the angle of slope, θ, is 30° to 90° to provide suitable light refraction. In certain embodiments, the height of islands 120 and/or the angle of slope for side walls 123 are predetermined to provide desired optical performance, e.g., desired refraction of light impinging on a side wall 123 or a top surface 124 of islands 120. In the example embodiment, side walls 123 are formed using a dry etching process in order to accurately form islands 120 having desired dimensions. In certain alternative embodiments, side walls 123 are formed using a wet etching process. For example, in a particular embodiment, using a suitable chemical, e.g., phosphoric acid ($H_3PO_4$), in a wet etching process provides side walls 123 having a curved, i.e., concave, profile. The curved surface of the side wall provides a relatively wider angle of diffusion. As a result of the dry etching process, side walls 123 are steep, e.g., approaching an angle of 80°-90° with respect to the surface of specular reflective layer 116 forming a narrow cone of diffuse light, whereas, as a result of the wet etching process, side walls are generally more gradual, approaching an angle of 30°-40° with respect to the surface of specular reflective layer 116 forming a relatively wider cone of diffuse light.

In example embodiments, an average island width is 5 micrometers to 20 micrometers and a density of islands in diffusion layer 118 is $5 \times 10^3$/millimeter $(mm)^2$ to $40 \times 10^3/mm^2$. Islands 120 can be positioned either randomly or in order, e.g., patterned in a predetermined pattern, within diffusion layer 118. The average island width and the density of islands in diffusion layer 118 may change depending on the application.

Referring again to FIGS. 1, 2, 4 and 5, in a particular embodiment, a transparent planar organic layer 125 is applied on diffusion layer 118 to cover each island 120 and each void 122 of diffusion layer 118. Although organic layer 125 may include any suitable material providing desired properties, in the example embodiment, organic layer 125 comprises a positive organic photoresist material or a negative organic photoresist material, such as commercially available from JSR Corporation located in Tokyo, Japan, for example. In this embodiment, organic layer 125 has a thickness of 0.3 micrometers to 5 micrometers, and, in particular embodiments, organic layer 125 has a thickness of 2 micrometers. Further, organic layer 125 has a third refractive index, less than the second refractive index of diffusion layer 118, of 1.4 to 1.6, and, in particular embodiments, organic layer 125 has a third refractive index of 1.5. In certain embodiments, the third refractive index of organic layer 125 may be equal to or different than the first refractive index of specular reflective layer 116. Organic layer 125 enhances the electrowetting properties of electrowetting pixel 102. More specifically, organic layer 125 enhances oil movement without negatively affecting optical performance of electrowetting pixel 102.

In the example embodiment, organic layer 125 is generally transparent; however, in a particular embodiment, organic layer 125 includes a suitable color filter 126. For example, organic layer 125 may include a colored organic material having a combination of color filters forming a plurality of color filters 126. In one embodiment, a pattern of RGB or RGBW pixels or sub-pixels are arranged within electrowetting pixel grid 101 at or near bottom support plate 104, e.g., on the TFT. In this embodiment, a color pigment is added to the organic material to form at least a portion of color filter 126. For example, referring to FIG. 5, a red pigment may be added to the organic material forming organic layer 125 within pixel (or sub-pixel) 102a to form a red pixel (or sub-pixel). In other pixels or sub-pixels, a green or blue pigment may be added to the organic material to form a green pixel (or sub-pixel) 102a or blue pixel (or sub-pixel) 102a, respectively. In alternative embodiments, color filter 126 may be positioned between top support plate 114 and common electrode 112 or directly on bottom support plate 104, e.g., beneath diffusion layer 118.

In one embodiment, organic layer 125 is formed by using a negative-type photoresist compound. Organic layer 125 may also be formed by a spin coating method and/or a slit coating method. A method of forming organic layer 125 is not limited to the coating method. Organic layer 125 may be formed by using an ink-jet printing process, a screen or silk printing process, a one drop filling (ODF) process, a transfer process, or a rolling process, for example. A desired thickness of organic layer 125 may be removed through an ashing process to form a mask pattern in certain embodiments.

In an alternative embodiment, organic layer 125 is formed using a positive-type photoresist compound. When a layer of light responsive compound forming organic layer 125 is exposed to light, light is provided to organic layer 125, and a partial exposure process of organic layer 125 may be performed. That is, when organic layer 125 includes the positive-type photoresist compound, a specific thickness of organic layer 125 is light reacted by the partial exposure process to remove the specific thickness of organic layer 125.

As shown in FIG. 5, in one embodiment, a capping layer 128, e.g., a silicon nitride layer, is applied over, e.g., deposited on, organic layer 125. An ITO layer 130 is applied over capping layer 128. In this embodiment, capping layer 128 improves adhesion of ITO layer 130 to organic layer 125. In this embodiment, ITO layer 130 has a thickness of 10 nanometers to 100 nanometers, and, in particular embodiments, ITO layer 130 has a thickness of 55 nm. Further, ITO layer 130 has a refractive index of 1.8 to 2.1, and, in particular embodiments, ITO layer 130 has a refractive index of 2.0.

Referring again to FIGS. 1 and 2, in certain embodiments, one or more layers may be positioned on ITO layer 130. For example, in the example embodiment, a suitable dielectric barrier layer 140 may at least partially separate electrode layer 110 from a hydrophobic layer 142, such as an amorphous fluoropolymer layer for example, forming a bottom surface of electrowetting pixel 102. For example, barrier layer 140 in certain embodiments is deposited on ITO layer 130. Dielectric barrier layer 140 may be formed from various materials including organic materials or a combination of organic and inorganic material stacks or layers. A thickness of the insulating layer may be less than 2 micrometers and may be less than 1 micrometer; for example, the insulating layer may be 400 nm or less in thickness. In some embodiments, hydrophobic lager 142 is an amorphous fluoropolymer layer including any suitable fluoropolymer(s), such as AF1600®, produced by DuPont, based in Wilmington, Del. Hydrophobic layer 142 may be transparent.

In the example embodiment, a plurality of pixel walls 108 form patterned electrowetting pixel grid 101 on hydrophobic layer 142. Pixel walls 108 may include a photoresist material such as, for example, epoxy-based negative photoresist SU-8. Patterned electrowetting pixel grid 101 includes a plurality of rows and a plurality of columns that form an array of electrowetting pixels, such as shown in FIG. 3, including a plurality of electrowetting pixels 102 that may have a width and a length in a range of about 50 to 500 micrometers, for example.

A first fluid 150, which may have a thickness (e.g., a height as shown in FIGS. 1 and 2 for example) in a range of about 1 to 10 micrometers, for example, overlays hydrophobic layer 142. First fluid 150 is partitioned by pixel walls 108 of patterned electrowetting pixel grid 101. A second fluid 152, such as an electrolyte solution, overlays first fluid 150 and pixel walls 108 of patterned electrowetting pixel grid 101. In certain embodiments, as described above, second fluid 152 may be electrically conductive and/or polar. For example, second fluid 152 may be water or a water solution, or a salt solution such as a solution of potassium chloride in water or a mixture of water and ethyl alcohol. In certain embodiments, second fluid 152 is transparent, but may be colored or absorbing. First fluid 150 is electrically non-conductive and may for example be an alkane like hexadecane or (silicone) oil. As described above, first fluid 150 is immiscible with second fluid 152.

Top support plate 114 covers second fluid 152 and one or more spacers 156 to maintain second fluid 152 over electrowetting pixel grid 101. In one embodiment, spacer 156 extends from top support plate 114 and may rest upon a top surface of one or more pixel walls 108. In alternative embodiments, spacer 156 does not rest on pixel wall 108 but is substantially aligned with pixel wall 108. This arrangement may allow spacer 156 to come into contact with pixel wall 108 upon a sufficient pressure or force being applied to top support plate 114. Multiple spacers 156 may be interspersed throughout electrowetting pixel grid 101. As shown in FIGS. 1 and 2, a seal 158 extends about a perimeter of electrowetting display device 100 to contain first fluid 150 and second fluid 152 within the fluid region of the cavity.

Reflective electrowetting display device 100 has a viewing side 160 corresponding to top support plate 114 through which an image formed by reflective electrowetting display device 100 may be viewed, and an opposing rear side 162 corresponding to bottom support plate 104 as shown, for example, in FIGS. 1 and 2. Reflective electrowetting display device 100 may be a segmented display type in which the image is built of segments. The segments may be switched simultaneously or separately. Each segment includes one electrowetting pixel 102 or a number of electrowetting pixels 102 that may be neighboring or distant from one another. Electrowetting pixels 102 included in one segment are switched simultaneously, for example. Electrowetting display device 100 may also be an active matrix driven display or a passive matrix driven display, for example.

As described above, hydrophobic layer 142 is arranged on bottom support plate 104 to create display surface area 106. The hydrophobic character of hydrophobic layer 142 causes first fluid 150 to adjoin preferentially to hydrophobic layer 142 because first fluid 150 has a higher wettability with respect to a top surface of hydrophobic layer 142 than second fluid 152 in the absence of a voltage. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid tends to form a film on the surface of the solid.

Referring further to FIGS. 4 and 5, because islands 120 of diffusion layer 118 are made of a suitable material having a refractive index greater than the refractive index of the specular reflective layer 116, islands 120 provide a diffusing effect on light entering the associated electrowetting pixel 102 and impinging on islands 120. Light that impinges on islands 120 may be refracted at a surface of island 120 as the light travels from organic layer 125 into island 120. The light propagates through island 120 and impinges on a surface of specular reflective layer 116, and is then reflected back through island 120 and/or organic layer 125. Light impinging on a surface of island 120, e.g., top surface 124 of island 120, may be reflected and propagate back through organic layer 125 to exit electrowetting pixel 102. Light passing through voids 122 impinges on specular reflector layer 114 and is reflected by specular reflector layer 114 to provide specular reflection. The combination of specular reflective layer 116 with diffusion layer 118 provides for a desired combination of specular reflection and diffuse reflection of light within electrowetting pixel 102, to provide a display having an improved paper-like appearance while maintaining a desired brightness level.

Referring further to FIG. 5, with an electric potential applied to electrowetting pixel 102a causing displacement of first fluid 150 disposed within electrowetting pixel 102a, light entering electrowetting display device 100 travels through electrowetting pixel 102a and impinges upon specular reflective layer 116 and/or one or more islands 120. For example, an incident light ray, such as light ray 170, impinging upon specular reflective layer 116 at a single incoming angle or direction is reflected by a surface of specular reflective layer 116 in a single mirror-like outgoing angle or direction as light ray 172, while an incident light ray, such as light ray 174, impinging upon a surface of island 120 at a single incoming angle or direction is refracted by island 120 such that light ray 174 propagates through island 120 at a different angle and impinges upon a surface of specular reflective layer 116 and is reflected by specular reflective layer 116 in a single mirror-like outgoing angle or direction as light ray 176 and exits island 120 at a different angle due to the difference in refractive indexes between islands 120 and organic layer 125.

Desired optical performance, such as an optimization of brightness and diffusion characteristics of electrowetting display device 100, can be achieved through reflective layer and/or diffusion layer design. For example, adjusting a number and/or a configuration of islands 120 in diffusion layer 118 may achieve such desired optical performance.

Figure 6:
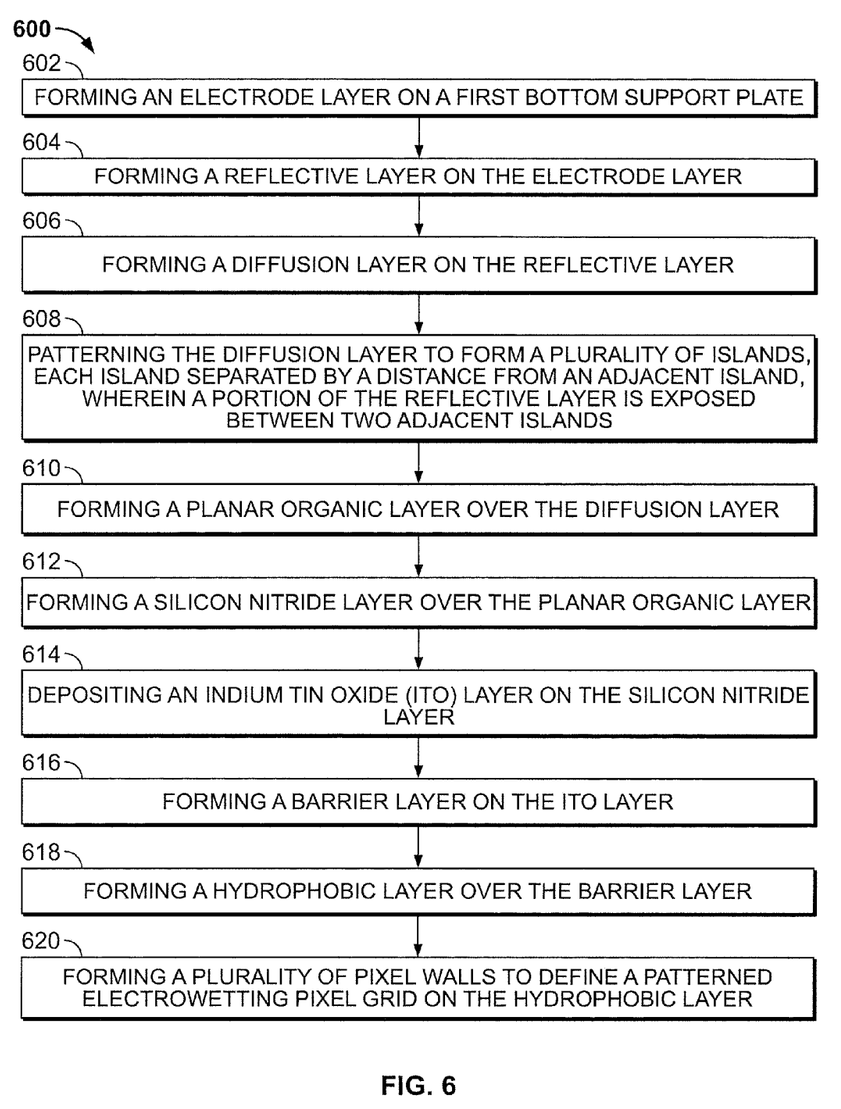
FIG. 6 illustrates an example method for fabricating the electrowetting display device of FIGS. 1-5.

FIG. 6 is a flow diagram of an example method 600 for fabricating an electrowetting display device, such as electrowetting display device 100 including specular reflective layer 116 and diffusion layer 118 as shown in FIGS. 1-5. Though claimed subject matter is not limited in this respect, process 600 may be performed manually (e.g., by humans) and/or using automated equipment. At block 602, an electrode layer 110 is formed on first or bottom support plate 104. In an example embodiment, electrode layer 110 is deposited on bottom support plate 104 using a suitable physical vapor deposition process (PVD) such as sputtering. Additional layers may be positioned between electrode layer 110 and bottom support plate 104. In one embodiment, a multilayer stack including a first conductive layer is formed on bottom support plate 104. In this embodiment, the first conductive layer is indium tin oxide (ITO), although in alternative embodiments the first conductive layer may be another suitable material. Deposition techniques include, for example, chemical vapor deposition (CVD), PVD, molecular beam epitaxy (MBE), and sputtering. The multilayer stack includes a first dielectric layer deposited on the first conductive layer. The first dielectric layer may comprise SiN, SiON, SiO, or TaO, for example. Any suitable deposition technique may be used, such as CVD, PVD, MBE, and a sputtering, for example.

In a particular embodiment, forming electrode layer 110 on bottom support plate 104 includes forming, e.g., disposing, 604 a reflective layer, such as specular reflective layer 116, on electrode layer 110. In this embodiment, the reflective layer, e.g., specular reflective layer 116, is made of a suitable material such as an aluminum material having a first refractive index. A diffusion layer 118 is then formed, e.g., deposited, 606 on the reflective layer having a thickness, in certain embodiments, of 100 nanometers to 1 micrometer and, more particularly, 200 nanometers to 500 nanometers. In the example embodiment, diffusion layer 118 comprising silicon nitride is deposited on specular reflective layer 116 using a suitable chemical vapor deposition process. Diffusion layer 118 has a second refractive index greater than the first refractive index.

Diffusion layer 118 is then patterned 608, e.g., using a diffractive mask, to form a plurality of islands 120 during the patterning process, wherein each island 120 of the plurality of islands is separated by a distance from an adjacent island of the plurality of islands to expose a portion of the reflective layer between two adjacent islands. In one embodiment, one or more voids 122 are defined through diffusion layer 118 to expose at least a portion of specular reflective layer 116. More specifically, in the example embodiment, during the patterning process a plurality of portions of diffusion layer 118 are removed to form a plurality of islands 120 and a plurality of voids 122 defining islands 120 separated by a distance between the plurality of islands 120.

An organic layer 125 is then formed, e.g., applied, 610 over diffusion layer 118. In one embodiment, a suitable organic material is applied to diffusion layer 118 to form a planar organic layer 125. The formed organic layer 125 covers islands 120 and voids 122 formed through diffusion layer 118. In a particular embodiment, a transparent organic layer 125 is formed on diffusion layer 118 to enhance the electrowetting properties of electrowetting pixel 102. More specifically, organic layer 125 may provide a desired smoothness to the surface to enhance oil movement without negatively affecting optical performance of electrowetting pixel 102. In one embodiment, a color filter is formed in organic layer 125 before, during, or after the organic material is applied over diffusion layer 118. In a particular embodiment, a photoresist color pigment is added to the organic material and the organic material is patterned, e.g., using a diffractive mask, to form uniform organic layer 125. A capping layer, e.g., a silicon nitride layer, is formed 612 over organic layer 125 and an ITO layer 130 is deposited 614 on the capping layer using a suitable technique, such as a sputtering technique.

In certain embodiments, a suitable barrier layer 140 is formed 616 on ITO layer 130 and a hydrophobic layer, such as an AF 1600® layer, (e.g., hydrophobic layer 142, shown in FIGS. 1 and 2) is formed 618 over barrier layer 140. At block 620, a plurality of pixel walls 108 are formed to define a patterned electrowetting pixel grid 101 on hydrophobic layer 142. In one embodiment, pixel walls 108 include a photoresist material such as, for example, epoxy-based negative photoresist SU-8. The formed patterned electrowetting pixel grid 101 includes a plurality of rows and a plurality of columns that form an array of electrowetting pixels, such as shown in FIG. 3, including a plurality of electrowetting pixels 102 having a suitable width and length.

In one embodiment, a photoresist material is deposited over the multilayer stack and at block 620 the photoresist material is exposed to a diffractive dark field mask to form pixel walls 108. In alternative embodiments, these structures may be printed using suitable methods other than photolithography, including, without limitation, direct writing and electron beam lithography (EBL). Pixel walls 108 are cured and fused together and the uncured portions of the photoresist material are removed to leave pixel walls 108.

Following formation of the pixel walls, first fluid 150 and second fluid 152 (e.g., the oil and the electrolyte solution) can be disposed within electrowetting pixels 102 of electrowetting display device 100. A second support plate, such as top support plate 114, is coupled to electrowetting display device 100. As shown in FIGS. 1 and 2 for example, top support plate 114 is opposite bottom support plate 104, forming opposing outer surfaces of electrowetting display device 100.

Figure 7:
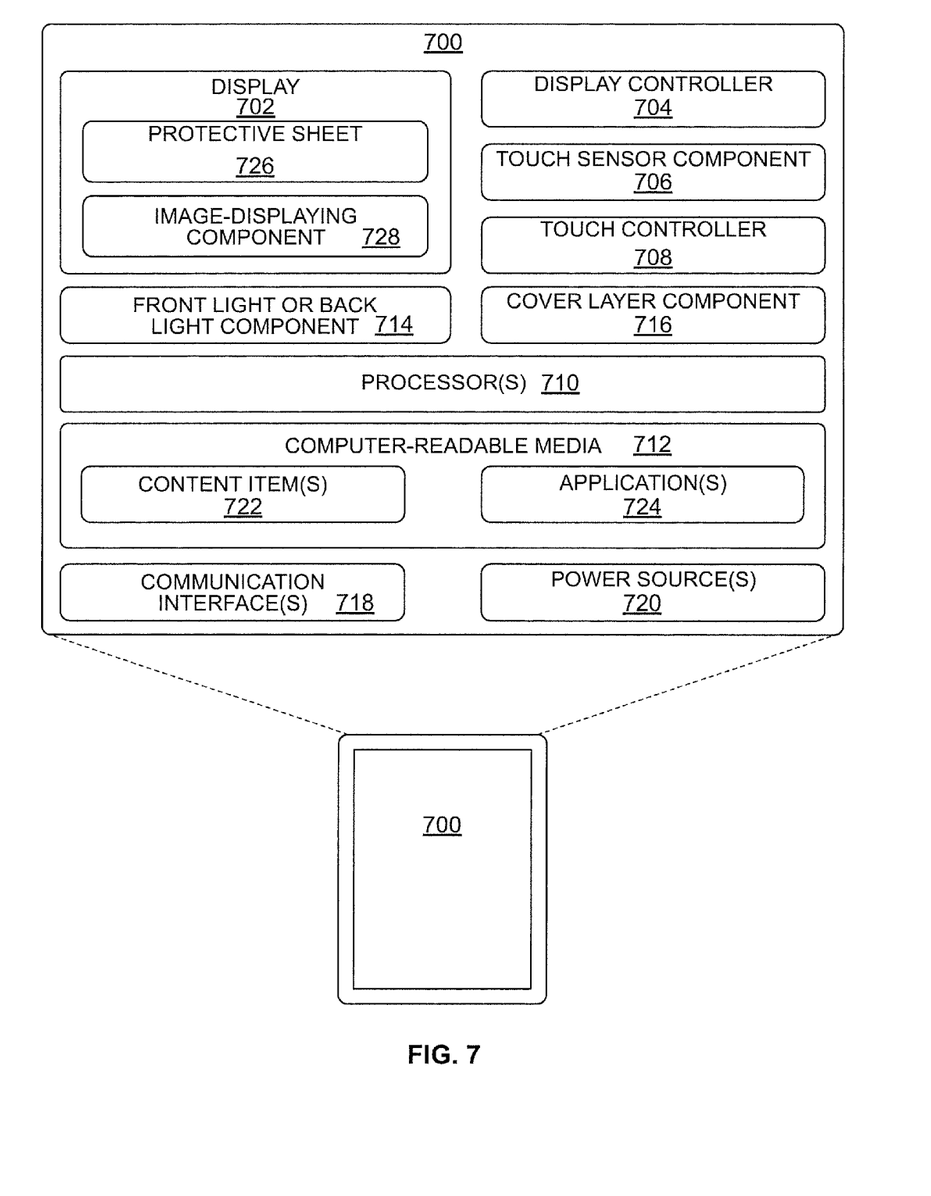
FIG. 7 illustrates an example electronic device that may incorporate an electrowetting display device, according to various embodiments.

FIG. 7 illustrates an example electronic device 700 that may incorporate any of the display devices discussed above. Electronic device 700 may comprise any type of electronic device having a display. For instance, electronic device 700 may be a mobile electronic device (e.g., an electronic book reader, a tablet computing device, a laptop computer, a smart phone or other multifunction communication device, a portable digital assistant, a wearable computing device, or an automotive display). Alternatively, electronic device 700 may be a non-mobile electronic device (e.g., a computer display or a television). In addition, while FIG. 7 illustrates several example components of electronic device 700, it is to be appreciated that electronic device 700 may also include other conventional components, such as an operating system, system busses, input/output components, and the like. Further, in other embodiments, such as in the case of a television or computer monitor, electronic device 700 may only include a subset of the components illustrated.

Regardless of the specific implementation of electronic device 700, electronic device 700 includes a display 702 and a corresponding display controller 704. Display 702 may represent a reflective or transmissive display in some instances or, alternatively, a transflective display (partially transmissive and partially reflective).

In one embodiment, display 702 comprises an electrowetting display that employs an applied voltage to change the surface tension of a fluid in relation to a surface. For example, such an electrowetting display may include the array of pixels 102 illustrated in FIG. 3, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by displacing a colored oil film if a voltage is applied to individual pixels of the display. If the voltage is absent, the colored oil forms a continuous film within a pixel, and the color may thus be visible to a user. On the other hand, if the voltage is applied to the pixel, the colored oil is displaced and the pixel becomes transparent. If multiple pixels of display 702 are independently activated, display 702 may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video or other animated content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, display 702 may represent a backlit display, examples of which are mentioned above.

In addition to including display 702, FIG. 7 illustrates that some examples of electronic device 700 may include a touch sensor component 706 and a touch controller 708. In some instances, at least one touch sensor component 706 resides with, or is stacked on, display 702 to form a touch-sensitive display. Thus, display 702 may be capable of both accepting user touch input and rendering content in response to or corresponding to the touch input. As several examples, touch sensor component 706 may comprise a capacitive touch sensor, a force sensitive resistance (FSR), an interpolating force sensitive resistance (IFSR) sensor, or any other type of touch sensor. In some instances, touch sensor component 706 is capable of detecting touches as well as determining an amount of pressure or force of these touches.

FIG. 7 further illustrates that electronic device 700 may include one or more processors 710 and one or more computer-readable media 712, as well as a front light component 714 (which may alternatively be a backlight component in the case of a backlit display) for lighting display 702, a cover layer component 716, such as a cover glass or cover sheet, one or more communication interfaces 718 and one or more power sources 720. The communication interfaces 718 may support both wired and wireless connection to various networks, such as cellular networks, radio, WiFi networks, short range networks (e.g., Bluetooth®), and infrared (IR) networks, for example.

Depending on the configuration of electronic device 700, computer-readable media 712 (and other computer-readable media described throughout) is an example of computer storage media and may include volatile and nonvolatile memory. Thus, computer-readable media 712 may include, without limitation, RAM, ROM, EEPROM, flash memory, and/or other memory technology, and/or any other suitable medium that may be used to store computer-readable instructions, programs, applications, media items, and/or data which may be accessed by electronic device 700.

Computer-readable media 712 may be used to store any number of functional components that are executable on processor 710, as well as content items 722 and applications 724. Thus, computer-readable media 712 may include an operating system and a storage database to store one or more content items 722, such as eBooks, audio books, songs, videos, still images, and the like. Computer-readable media 712 of electronic device 700 may also store one or more content presentation applications to render content items on electronic device 700. These content presentation applications may be implemented as various applications 724 depending upon content items 722. For instance, the content presentation application may be an electronic book reader application for rending textual electronic books, an audio player for playing audio books or songs, or a video player for playing video.

In some instances, electronic device 700 may couple to a cover (not illustrated in FIG. 7) to protect display 702 (and other components in the display stack or display assembly) of electronic device 700. In one example, the cover may include a back flap that covers a back portion of electronic device 700 and a front flap that covers display 702 and the other components in the stack. Electronic device 700 and/or the cover may include a sensor (e.g., a Hall effect sensor) to detect whether the cover is open (i.e., if the front flap is not atop display 702 and other components). The sensor may send a signal to front light component 714 if the cover is open and, in response, front light component 714 may illuminate display 702. If the cover is closed, meanwhile, front light component 714 may receive a signal indicating that the cover has closed and, in response, front light component 714 may turn off.

Furthermore, the amount of light emitted by front light component 714 may vary. For instance, upon a user opening the cover, the light from the front light may gradually increase to its full illumination. In some instances, electronic device 700 includes an ambient light sensor (not illustrated in FIG. 7) and the amount of illumination of front light component 714 may be based at least in part on the amount of ambient light detected by the ambient light sensor. For example, front light component 714 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of display 702 may vary depending on whether front light component 714 is on or off, or based on the amount of light provided by front light component 714. For instance, electronic device 700 may implement a larger default font or a greater contrast when the light is off compared to when the light is on. In some embodiments, electronic device 700 maintains, if the light is on, a contrast ratio for display 702 that is within a certain defined percentage of the contrast ratio if the light is off.

As described above, touch sensor component 706 may comprise a capacitive touch sensor that resides atop display 702. In some examples, touch sensor component 706 may be formed on or integrated with cover layer component 716. In other examples, touch sensor component 706 may be a separate component in the stack of the display assembly. Front light component 714 may reside atop or below touch sensor component 706. In some instances, either touch sensor component 706 or front light component 714 is coupled to a top surface of a protective sheet 726 of display 702. As one example, front light component 714 may include a lightguide sheet and a light source (not illustrated in FIG. 7). The lightguide sheet may comprise a substrate (e.g., a transparent thermoplastic such as PMMA or other acrylic), a layer of lacquer and multiple grating elements formed in the layer of lacquer that function to propagate light from the light source towards display 702; thus, illuminating display 702.

Cover layer component 716 may include a transparent substrate or sheet having an outer layer that functions to reduce at least one of glare or reflection of ambient light incident on electronic device 700. In some instances, cover layer component 716 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a $3h$ pencil). Without such scratch resistance, a device may be more easily scratched and a user may perceive the scratches from the light that is dispersed over the top of the reflective display. In some examples, protective sheet 726 may include a similar UV-cured hard coating on the outer surface. Cover layer component 716 may couple to another component or to protective sheet 726 of display 702. Cover layer component 716 may, in some instances, also include a UV filter, a UV-absorbing dye, or the like, for protecting components lower in the stack from UV light incident on electronic device 700. In still other examples, cover layer component 716 may include a sheet of high-strength glass having an antiglare and/or antireflective coating.

Display 702 includes protective sheet 726 overlying an image-displaying component 728. For example, display 702 may be preassembled to have protective sheet 726 as an outer surface on the upper or image-viewing side of display 702. Accordingly, protective sheet 726 may be integral with and may overlay image-displaying component 728. Protective sheet 726 may be optically transparent to enable a user to view, through protective sheet 726, an image presented on image-displaying component 728 of display 702.

In some examples, protective sheet 726 may be a transparent polymer film in the range of 25 to 200 micrometers in thickness. As several examples, protective sheet 726 may be a transparent polyester, such as polyethylene terephthalate (PET) or polyethylene naphthalate (PEN), or other suitable transparent polymer film or sheet, such as a polycarbonate or an acrylic. In some examples, the outer surface of protective sheet 726 may include a coating, such as the hard coating described above. For instance, the hard coating may be applied to the outer surface of protective sheet 726 before or after assembly of protective sheet 726 with image-displaying component 728 of display 702. In some examples, the hard coating may include a photoinitiator or other reactive species in its composition, such as for curing the hard coating on protective sheet 726. Furthermore, in some examples, protective sheet 726 may be dyed with a UV-light-absorbing dye, or may be treated with other UV-absorbing treatment. For example, protective sheet 726 may be treated to have a specified UV cutoff such that UV light below a cutoff or threshold wavelength is at least partially absorbed by protective sheet 726, thereby protecting image-displaying component 728 from UV light.

According to some embodiments herein, one or more of the components discussed above may be coupled to display 702 using fluid optically-clear adhesive (LOCA). For example, the light guide portion of front light component 714 may be coupled to display 702 by placing LOCA on the outer or upper surface of protective sheet 726. If the LOCA reaches the corner(s) and/or at least a portion of the perimeter of protective sheet 726, UV-curing may be performed on the LOCA at the corners and/or the portion of the perimeter. Thereafter, the remaining LOCA may be UV-cured and front light component 714 may be coupled to the LOCA. By first curing the corner(s) and/or the perimeter, the techniques effectively create a barrier for the remaining LOCA and also prevent the formation of air gaps in the LOCA layer, thereby increasing the efficacy of front light component 714. In other embodiments, the LOCA may be placed near a center of protective sheet 726, and pressed outwards towards a perimeter of the top surface of protective sheet 726 by placing front light component 714 on top of the LOCA. The LOCA may then be cured by directing UV light through front light component 714. As discussed above, and as discussed additionally below, various techniques, such as surface treatment of the protective sheet, may be used to prevent discoloration of the LOCA and/or protective sheet 726.

While FIG. 7 illustrates a few example components, electronic device 700 may have additional features or functionality. For example, electronic device 700 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within electronic device 700 may reside remotely from electronic device 700 in some implementations. In these implementations, electronic device 700 may utilize communication interfaces 718 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A display device, comprising:
   a first support plate;
   a pixel region over the first support plate, the pixel region comprising a pixel and an electrode layer disposed between the first support plate and the pixel;
   a specular reflective layer disposed on the electrode layer, the specular reflective layer having a first refractive index; and
   a diffusion layer disposed on the specular reflective layer, the diffusion layer comprising a plurality of islands, each island of the plurality of islands separated by a distance from an adjacent island of the plurality of islands, wherein a portion of the specular reflective layer is exposed between two adjacent islands of the plurality of islands, each island having a second refractive index greater than the first refractive index.

2. The display device of claim 1, further comprising:
   a first fluid and a second fluid that is immiscible with the first fluid, the first fluid and the second fluid arranged in the pixel region, wherein the electrode layer is coupled to a common electrode for creating a voltage differential between the electrode layer and the common electrode to cause relative displacement of the first fluid and the second fluid to expose at least a portion of the specular reflective layer and at least one island of the plurality of islands; and
   a second support plate coupled to the first support plate.

3. The display device of claim 1, further comprising an organic layer applied over the electrode layer and the plurality of islands.

4. The display device of claim 3, wherein the organic layer provides a color filter.

5. The display device of claim 3, further comprising:
   a silicon nitride (SiN) layer disposed over the organic layer; and an indium tin oxide (ITO) layer disposed over the silicon nitride layer.

6. The display device of claim 1, wherein the specular reflective layer comprises one of a metal, an alloy, a doped metal, or a dielectric reflector material and each island comprises a silicon nitride material.

7. The display device of claim 1, wherein the specular reflective layer has a first refractive index less than 2 and each island has a second refractive index of at least 2.

8. The display device of claim 7, further comprising an organic layer disposed over the diffusion layer and the specular reflective layer, the organic layer having a third refractive index of 1.5.

9. The display device of claim 1, wherein each island of the plurality of islands has a curved side wall.

10. The display device of claim 1, wherein an average width of an island of the plurality of islands is 5 micrometers to 20 micrometers.

11. The display device of claim 1, wherein a density of the plurality of islands in the diffusion layer is $5\times10^3$/millimeter $(mm)^2$ to $40\times10^3/mm^2$.

12. The display device of claim 1, wherein the specular reflective layer has a reflectance greater than 0.2500.

13. A display device, comprising:
a first support plate and an opposing second support plate;
a pixel region positioned between the first support plate and the second support plate, the pixel region comprising a pixel;
an electrode layer positioned over the first support plate;
a specular reflective layer positioned on the electrode layer and within the pixel, the specular reflective layer having a first refractive index;
a diffusion layer disposed on the specular reflective layer within the pixel, the diffusion layer comprising a plurality of islands, each island of the plurality of islands separated by a distance from an adjacent island of the plurality of islands, wherein a portion of the specular reflective layer is exposed between two adjacent islands of the plurality of islands, each island of the plurality of islands having a second refractive index greater than the first refractive index; and
a planar organic layer disposed over the diffusion layer and the specular reflective layer.

14. The display device of claim 13, wherein an average width of an island of the plurality of islands is 5 micrometers to 20 micrometers.

15. The display device of claim 13, wherein a density of the plurality of islands in the diffusion layer is $5\times10^3$/millimeter $(mm)^2$ to $40\times10^3/mm^2$.

16. The display device of claim 13, wherein the planar organic layer comprises a color pigment.

* * * * *